United States Patent
Lindquist et al.

(10) Patent No.: US 6,687,362 B1
(45) Date of Patent: Feb. 3, 2004

(54) AUTOMATIC ADDRESS BOOK UPDATE SYSTEM

(75) Inventors: Wesley DeWayne Lindquist, Kansas City, MO (US); John William Sullivan, Overland Park, KS (US)

(73) Assignee: Hallmark Cards, Incorporated, Kansas City, KS (US)

( * ) Notice: Subject to any disclaimer, the term of this patent is extended or adjusted under 35 U.S.C. 154(b) by 0 days.

(21) Appl. No.: 09/502,960

(22) Filed: Feb. 11, 2000

(51) Int. Cl.$^7$ ................................................ H04M 3/42
(52) U.S. Cl. .......................... 379/218.01; 379/356.01; 707/100
(58) Field of Search .......................... 707/10, 100, 200; 379/88.01, 188, 196, 197, 198, 199, 200, 218.01, 356.01

(56) References Cited

U.S. PATENT DOCUMENTS

| | | | |
|---|---|---|---|
| 5,146,403 A | | 9/1992 | Goodman |
| 5,544,229 A | * | 8/1996 | Creswell et al. ....... 379/114.05 |
| 5,930,700 A | * | 7/1999 | Pepper et al. ................ 455/414 |
| 6,173,045 B1 | * | 1/2001 | Smith ....................... 379/93.23 |
| 6,185,295 B1 | * | 2/2001 | Frederiksen et al. ......... 379/355 |
| 6,278,454 B1 | * | 8/2001 | Krishnan ............... 379/100.05 |
| 6,321,078 B1 | * | 11/2001 | Menelli et al. ............. 455/407 |
| 6,324,264 B1 | * | 11/2001 | Wiener et al. ........... 379/88.22 |
| 6,327,343 B1 | * | 12/2001 | Epstein et al. ........... 379/88.01 |
| 6,529,724 B1 | * | 3/2003 | Khazaka et al. ............ 455/405 |

FOREIGN PATENT DOCUMENTS

WO   WO 99/57859 A1   11/1999

OTHER PUBLICATIONS

"Mail Address Change Notification", IBM Technical Disclosure Bulletin, IBM Corp., New York, US, vol. 36, No. 1, 1993, pp. 70–72.

"Mechanism To Automatic Updateing Obsolete Telephone Numbers", IBM Technical Disclosure Bulletin, IBM Corp., New York, US, vol. 37, No 4A, Apr. 1, 1994, pp. 115–116.

* cited by examiner

Primary Examiner—John Breene
Assistant Examiner—Cheryl Lewis
(74) Attorney, Agent, or Firm—Patton Boggs LLP

(57) ABSTRACT

The automatic address book update system which automates the data collection and maintenance tasks for computerized address book systems. The automatic address book update system is architected to automatically update the data contained therein, by automatically populating the address entries of a subscriber's computerized address book system. This is accomplished as part of the origination/receipt of a telephone call by the subscriber, where the Local Exchange Carrier (LEC) maintains a customer database (identifying the name, address, telephone number) of their local customers and can also retrieve this information from other Local Exchange Carriers on a long distance call. Upon the initiation of a call connection between the subscriber and a calling/called party, the Local Exchange Carrier identifies the address book update service authorization for the subscriber, retrieves the calling/called party's customer database information, and transmits this information to the subscriber's address books system to populate an entry therein under the name of the calling/called party.

20 Claims, 4 Drawing Sheets

Address Book for Jack Power

| Last Name | First Name | Address | City | State | Zip | Phone Number | Email | Directory |
|---|---|---|---|---|---|---|---|---|
| Doe | Jane | 2224 Mockingbird | Anytown | MO | 11144 | 816-555-8888 | jadoe@yahoo.com | Family |
| Doe | John | 188 State Street | New York | NY | 10056 | 313-555-2222 | jodoe@yahoo.com | Family |
| Hallmark | Suzie | 424 S. Minnesota | Nowhere | KS | 66555 | 785-555-2668 | szq@hallmark.com | Work |
| Doe | Mom | 333 Lincoln Blvd. | Boston | MA | 10000 | 888-555-1111 | madoe@yahoo.com | Family |
| Doe | Dad | 333 Lincoln Blvd. | Boston | MA | 10000 | 313-555-2222 | dadoe@yahoo.com | Family |
| Hallmark | Bill | 765 Washington Street | Kansas City | KS | 66543 | 785-555-1344 | bbill@hallmark.com | Work |
| Right | Dewey | 344 Arrow Lane | Kansas City | MO | 66502 | 816-555-2346 | dright@abbc.com | Church |
| More | Patty | 678 Grambling Road | Kansas City | MO | 66502 | 816-555-2347 | pattym@kc.net | Church |
| Slice | Pete | 117 Greenway | Kansas City | MO | 66502 | 816-555-2348 | slice@kc.net | Golf League |
| Hook | Frank | 8990 79th Street | Kansas City | MO | 66502 | 816-555-2349 | hook@golf.com | Golf League |

*FIG. 2*

AUTOMATIC ADDRESS BOOK UPDATE SYSTEM

CROSS-REFERENCE TO RELATED APPLICATIONS

This application is related to a U.S. patent application Ser. No. 091/502,728, titled "Reciprocal, Maintenance Free Community Membership Data Management System" and filed on the same date as the present application.

FIELD OF THE INVENTION

This invention relates to the field of computerized address book systems and, in particular, to a system for automatically updating the data contained therein, by automatically populating the address entries of the computerized address book system.

Problem

It is a problem in the field of computerized address book systems to maintain the accuracy and completeness of the data contained therein. Existing computerized address book systems are architected as "flat files" with the expectation that each individual enters data into their personal computerized address book system independent of any other computerized address book systems. The insular nature of the computerized address book systems renders the data input and data management tasks time consuming and subject to inaccuracy. In particular, existing computerized address book systems rely on the user to input the data, verify its accuracy, and maintain the data so that it is current. Even a set of data entries of modest extent is time consuming to maintain, due to the individuals identified therein moving, changing telephone numbers, and the like.

One system that addresses the automated change of address issue is disclosed in U.S. Pat. No. 5,146,403 which discloses a change of address system that uses a plurality of public change of address kiosk terminals installed at a wide diversity of public locations to receive and store customized subscriber change of address information. The user inputs their updated address information into the change of address kiosk terminal, which forwards this data to a central service computer. The central service computer transmits recipient information to the change of address kiosk terminal for display to the user who selects various of these displayed recipients to receive the change of address information as well as other recipients, whose address information is manually entered into the change of address kiosk terminal by the user. The change of address kiosk terminal prints change of address cards for selected ones of these identified recipients and automatically forwards the user's change of address information to the postal service and other selected recipients identified by the user. This change of address system simply automates the printing of the change of address cards at the change of address kiosk terminal based on user provided information and electronically transmits the change of address card information to selected recipients.

Therefore, existing computerized address book systems are of limited usefulness and are typically limited to the storage of basic information, such as: name, address, telephone number. These existing computerized address book systems are insular in nature and require manual data entry and data updating by the user. Thus, there is presently no system that automates the data collection and maintenance tasks for a plurality of individual computerized address book systems.

Solution

The above described problems are solved and a technical advance achieved by the present automatic address book update system which automates the data collection and maintenance tasks for computerized address book systems. The automatic address book update system is architected to automatically update the data contained therein, by automatically populating the address entries of a subscriber's computerized address book system. This is accomplished as part of the origination/receipt of a telephone call by the subscriber, where the Local Exchange Carrier (LEC) maintains a customer database (identifying the name, address, telephone number) of their local customers and can also retrieve this information from other Local Exchange Carriers on a long distance call. Upon the initiation of a call connection between the subscriber and a calling/called party, the Local Exchange Carrier identifies the address book update service authorization for the subscriber, retrieves the calling/called party's customer database information, and transmits this information to the subscriber's address books system to populate an entry therein under the name of the calling/called party.

There are a number of implementations possible for the present automatic address book update system. In particular, this system can maintain a subscriber's computerized address book system at a central location, such as on an Internet WEB site, for remote access by the subscriber, or can transmit the address update data to the subscriber's computerized address book system which executes on a terminal device operated by the subscriber and is connectable to the present automatic address book update system via a data communication connection, or can operate in a shared or alternate combination or variation of these two operational modes.

The present automatic address book update system therefore eliminates the need for the manual entry of member data into the subscriber's address book and can also automatically update the entries contained therein when the relevant data for a member changes.

BRIEF DESCRIPTION OF THE DRAWING

FIG. 2 illustrates in table form typical database entries used in the present automatic address book update system.

DETAILED DESCRIPTION

The automatic address book update system automates the data collection and maintenance tasks for computerized address book systems. The computerized address book systems typically execute on a terminal device operated by the subscriber, although they can also execute at a central location for remote access by the subscriber. The computerized address book systems encompass a broad variety of applications for the management of subscriber data, which subscriber data include, but are not limited to: mailing lists, membership lists, personal data relating to gift recipient clothing sizes, personal data relating to gifts given in the past to a recipient, and the like. The automatic address book update system is architected to automatically update the data contained therein, by automatically populating the address entries of a subscriber's computerized address book system. This is accomplished as part of the origination/receipt of a telephone call by the subscriber, where the Local Exchange Carrier (LEC) maintains a customer database (identifying the name, address, telephone number) of their local customers and can also retrieve this information from other Local Exchange Carriers on a long distance call. Upon the initiation of a call connection between the subscriber and a calling/called party, the Local Exchange Carrier identifies the address book update service authorization for the subscriber, retrieves the calling/called party's customer database information, and transmits this information to the subscriber's address books system to populate an entry therein under the name of the calling/called party.

System Architecture

Figure 1A:
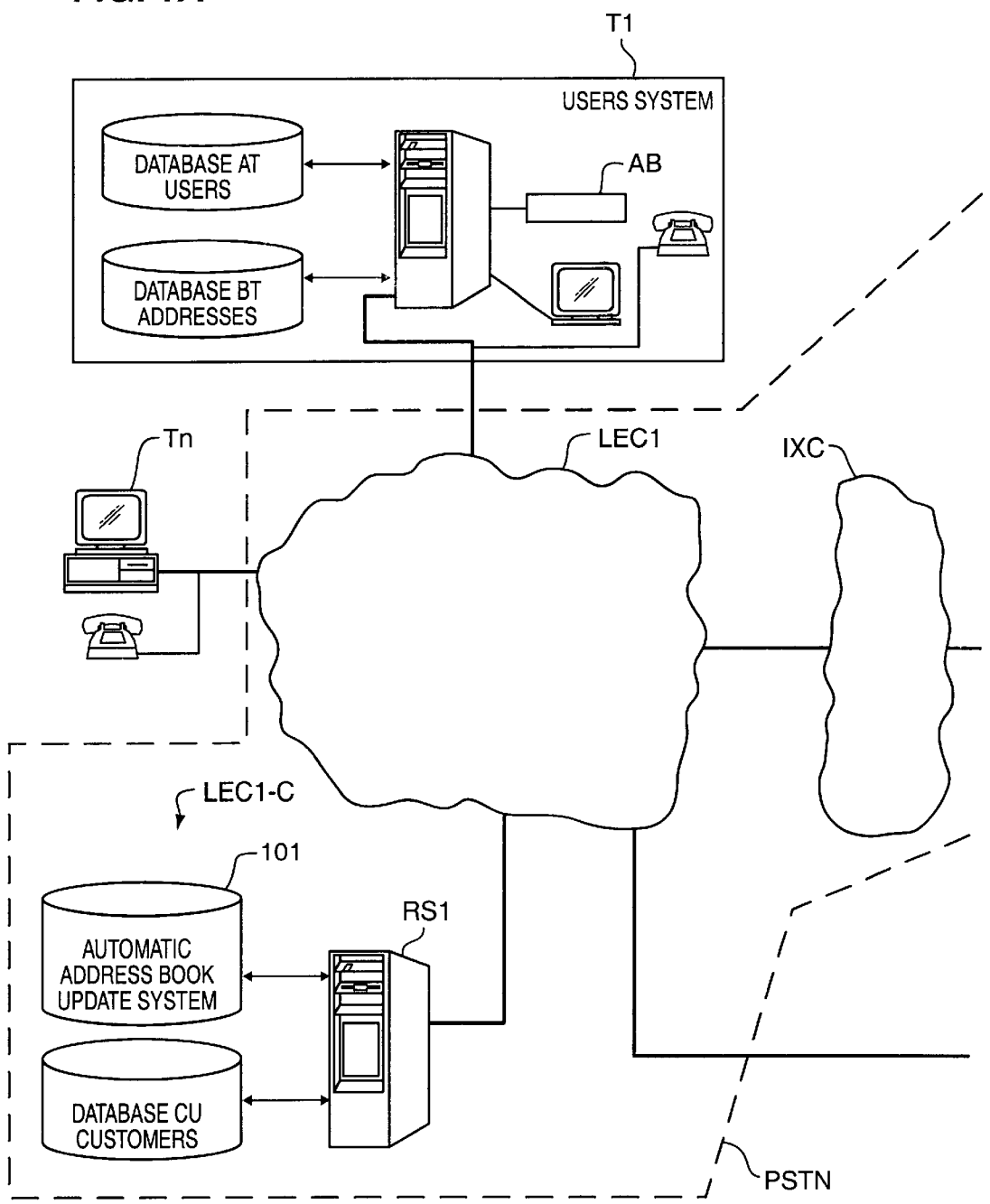
FIGS. 1A & 1B illustrate in block diagram form the overall architecture of the present automatic address book update system and a data communication environment in which it is operational.
Figure 1B:
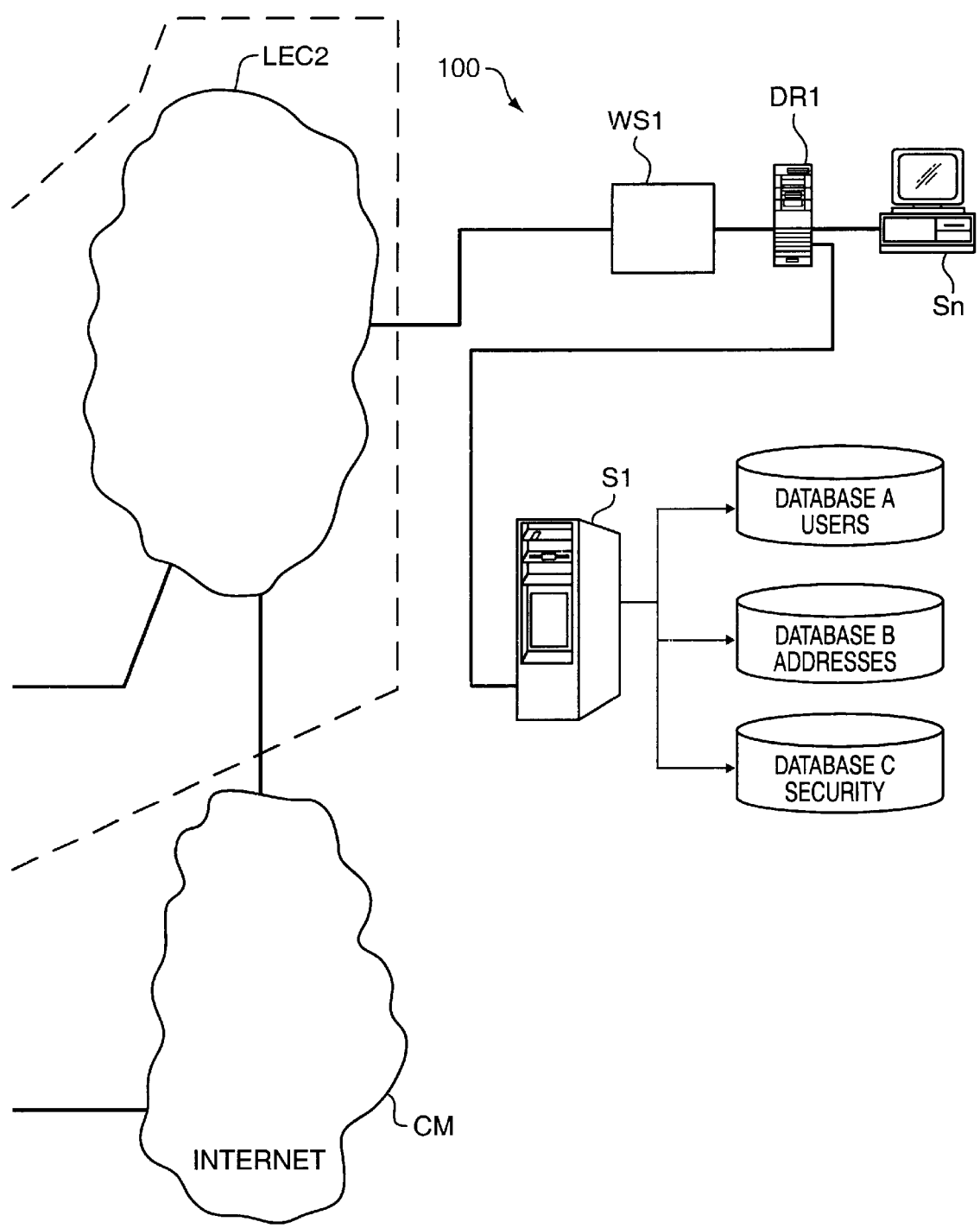

FIG. 1 illustrates in block diagram form the overall architecture of an implementation of the present automatic address book update system and a typical data communication environment in which it is operational. In particular, subscribers are typically equipped with one or more pieces of communication equipment, including but not limited to: a telephone station set, personal computer, hand held computing device, cellular communication device, Personal Data Assistant (PDA), or other data interface device, collectively termed "terminal equipment" T1–Tn herein. The terminal equipment T1 is used in a conventional manner to originate calls to called parties and to receive calls from calling parties (referred to as "calling/called party" herein). In the following description, the subscriber is denoted by the terminal equipment indicator T1 and the calling/called party is denoted by the terminal equipment indicator Tn since, from the perspective of the Local Exchange Carrier, that is the primary identifier used in processing telephone calls (termed "call connection" herein).

The present automatic address book update system 101 is incorporated into the Network Control (LEC1-C) of the Local Exchange Carrier (LEC1), which maintains a data storage and processing complex (LEC1-C), that is connectable to at least one data communication medium CM (such as the Internet). In particular, the existing communications network comprises a traditional voice communications network that includes a plurality of local communications systems LEC1, LEC2, such as telephone switching systems that are part of the Public Switched Telephone Network (PSTN) and are interconnected via trunk circuits to an Interexchange Carrier System (IXC). Each of the communications systems LEC1, LEC2 serve a plurality of terminal devices and the communications systems LEC1, LEC2 may be interconnected via an out of band signaling link through the Interexchange Carrier System (IXC), using the well known SS7 signaling protocol. The operation of such a communications network is well known and is not described in detail herein.

The location of the subscriber's address book can vary and, for example, can reside (at least in part) on the subscriber's terminal equipment T1 where the consumer can perform an access to their computerized address book system AB (such as a day-timer type of system). In this example, the subscriber's terminal equipment can optionally maintain a Database AT that identifies the subscribers who use the terminal equipment T1, such as the various members of a family. In addition, Database BT lists the addresses of individuals known to the subscribers of terminal equipment T1.

Alternatively, the entirety, or a portion, of the address book function is resident on a central location, such as Web site 100, and is accessed by the automatic address book update system 101. Such a centrally located address book system is described in the U.S. Patent Application titled "Reciprocal, Maintenance Free Community Membership Data Management System" noted above and is incorporated by reference into this application as if included in its entirety herein. For the purpose of this description, an Internet data communication connection from the automatic address book update system 101 to a centrally located, Web-based address book is used as the example to illustrate the operation of the automatic address book update system 101 to update the centrally located subscriber address book.

The web site 100 includes a data processing system on which the subscriber's address book resides, and includes: interactive web server WS1, communications and data router DR1, a plurality of servers S1–Sn which function to manage a plurality of databases, some of which can optionally or in part be resident on the subscriber's terminal equipment T1. The Web site 100 includes various data management processes, some of which are described below, as well as a plurality of databases which include: Database A—Subscribers, Database B—Address Book, Database C—Security.

Architecture and Content of Databases

The automatic address book update system 101 functions to provide data input to the central repository of subscribers' address books, Web site 100. Each subscriber address book contains entries representative of a plurality of members, representing individuals, organizations, businesses, and the like that the subscriber has contacted. Each member has associated therewith a set of data representative of the members' attributes, such as: name, mailing address, E-Mail address, telephone number, fax number, and optionally, personal attributes, such as: date of birth, clothing sizes, gift preferences, and the like. It is important that this member data is automatically populated and verified to ensure the accuracy of the subscriber's address book.

FIG. 2 illustrates a typical address book structure that can be used in a subscriber's computerized address book system. The address book contains basic address information, including: name, address, telephone number, E-Mail address, as well as sub-directory. The subscriber's address book can also include a significant amount of personal data relating to the interests of the various members. These various data elements are divided into a plurality of data fields, listed below the address book entries.

Data Updates to Community Address Books

Figure 3:
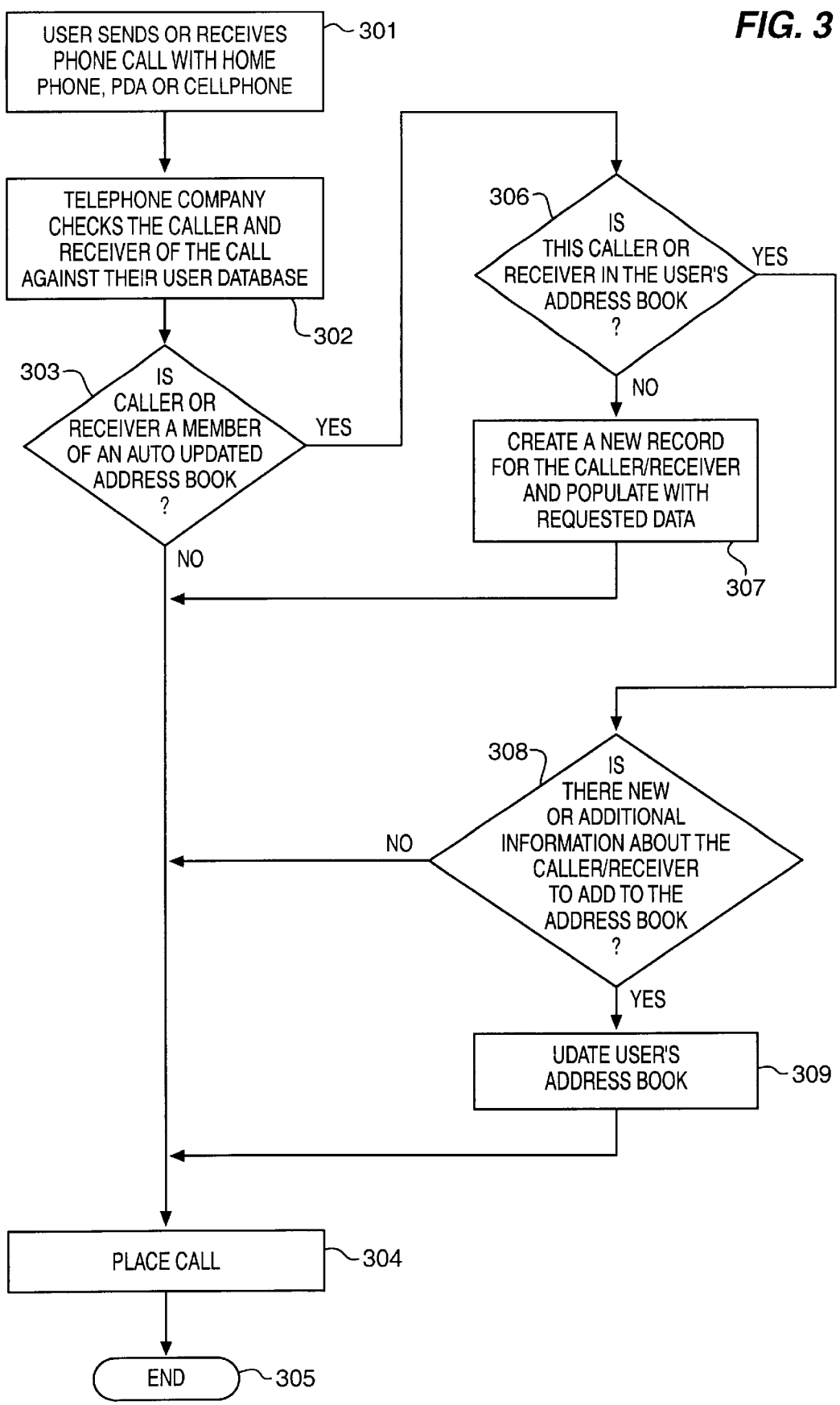
FIG. 3 illustrates in flow diagram form the operation of the present automatic address book update system to update data entries stored in the address books of the members.

FIG. 3 illustrates in flow diagram form the operation of the present automatic address book update system 101 to update data entries stored in the address books of the subscribers who are registered to use this function. In particular, at step 301, a subscriber of the automatic address book update system 101, while at their terminal equipment T1, originates or receives a telephone call with an individual located at terminal equipment Tn, using some form of communication device: telephone station set, personal computer, cellular telephone, Personal Digital Assistant, or the like. The subscriber can optionally block the operation of the automatic address book update system 101 by inputting a predetermined service code of conventional telephone service activation format *XX, for example. At step 302, the Local Exchange Carrier LEC1 activates the Network Control LEC1-C to review the customer database (Database CU) to identify the subscriber T1 and the calling/called party Tn with whom the subscriber is engaged in the origination of a call connection and, at step 303, determines whether the subscriber T1 and/or calling/called party Tn are authorized to use the automatic address book update system feature, as well as the identity of the server (Web site 100) which maintains the subscriber's address book. If neither party is subscribed to this service, then call processing advances to step 304 where the Local Exchange Carrier LEC1 establishes the call connection between the subscriber T1 and the calling/called party Tn. Processing then exits at step 305.

In the instance where one or both of the subscriber T1 and calling/called party Tn are authorized to use the automatic address book update system feature, processing advances from step 303 to step 306 where the automatic address book update system 101 reviews the data entries in the subscriber's address book and/or the calling/called party's address book. This step is executed as a function of the location of the address books that are to be updated. In the instance where the address book resides on a Web site 100, such as Hallmark.com, the automatic address book update system 101 connects to this Web site. The data communication connection between the automatic address book update system 101 and the automatic address book update system 101 of the Network Control LEC1-C of the Local Exchange Carrier LEC1 and the Web site 100 can be via the Internet, using the well known personal computer modem and Internet browser technology. The physical connection that supports this data communication connection is typically effected from automatic address book update system 101 of the Network Control LEC1-C of the Local Exchange Carrier LEC1 to the Internet CM which is also connected thereto. The Internet CM is also connected to a Local Exchange Carrier LEC2 which serves the communications and data router DR1 of the Web site 100. Once connected to the Web site 100 by Internet CM, an authentication access process is executed by Web site 100 to determine whether the accessing party (automatic address book update system 101) is authorized to access subscriber address books residing on Web site 100. If authorization is approved, the automatic address book update system 101 reviews the address book entries for the subscriber T1 and/or calling/called party Tn.

The automatic address book update system 101 determines whether the subscriber T1 is listed in the calling/called party's address book and/or whether the calling/called party Tn is listed in the subscriber's address book. If not, at step 307, the automatic address book update system 101 accesses the subscriber's and/or calling party's address book entries stored in Database B and creates an entry therein with the data retrieved from the customer database (Database CU) maintained by the Local Exchange Carrier LEC1. Call processing then advances to step 304 where the Local Exchange Carrier LEC1 establishes the call connection between the subscriber T1 and the calling/called party Tn. Processing then exits at step 305.

If it is determined at step 306 that the subscriber T1 is listed in the calling/called party's address book and/or the calling/called party Tn is listed in the subscriber's address book, then at step 306 the automatic address book update system 101 retrieves the relevant address book entry from Database B. The content of the retrieved data is reviewed and the automatic address book update system 101 determines whether there is additional or updated information available to add to the address book entry, such as a cell phone number where the address book entry only lists a telephone station set number. If so, at step 308, the automatic address book update system 101 updates the associated address book entry in Database B and call processing advances to step 304 where the Local Exchange Carrier LEC1 establishes the call connection between the subscriber T1 and the calling/called party Tn. Processing then exits at step 305.

If it is determined that there is not additional or updated information available to add to the address book entry, at step 308, call processing advances to step 304 where the Local Exchange Carrier LEC1 establishes the call connection between the subscriber T1 and the calling/called party Tn. Processing then exits at step 305.

Alternative Implementations

The location of the calling/called party Tn determines how the automatic address book update system 101 executes the address book update function. The above-described example illustrated the instance where both the subscriber T1 and the calling/called party Tn were served by the same Local Exchange Carrier LEC1. If the calling/called party were located remotely from the subscriber T1 and is served by a difference Local Exchange Carrier LEC2, then the automatic address book update system 101 must communicate with the Network Control (not shown) of the remote Local Exchange Carrier LEC2 to retrieve data from the customer database of the Local Exchange Carrier LEC2. As noted above, the communication between Local Exchange Carriers can be effected by the SS7 signaling protocol in an out of band signaling manner.

Other variations of the above-noted address book update process are where the automatic address book update system 101 is selected, as determined at step 301, to only add entries on outgoing calls, or only on incoming calls, or entries are added to the subscriber's address book once a predetermined number/frequency of calls occur between the subscriber and the calling/called party. In this last example, the subscriber's address book is not populated with every call received or originated, but only with entries representative of frequently called numbers. The calling/called party data can be stored in cache memory for each subscriber and the address book entry update process is initiated only when a predetermined threshold of call frequency and/or number of calls is exceeded for this identified calling/called party.

The population of address book entries into the subscriber's address book can be reviewed by the subscriber by the subscriber accessing their address book which is stored on the Web site 100 via their personal computer. The subscriber can then edit these entries, move entries among a plurality of sub-directories and even input address blocking data to prevent certain numbers, area codes, and the like from populating the subscriber's address book.

Another variation of this address book process is the population of a subscriber address book database BT resident on the subscriber's personal computer. This can be accomplished when the subscriber accesses their address book which is stored on the Web site 100 via their personal computer. The subscriber can then upload new address book entries to Database BT to maintain consistence between the two address books.

The subscriber can also maintain a plurality of address books, as a function of the type of terminal equipment used (cellular, telephone station set, personal computer, and the like), or telephone number (business line, residence line, cellular line, and the like), or any other variable. These address books can be independent of each other or the Web site 100 may enable the subscriber to edit the address books into a unified directory-based architecture.

In addition, the above-description is provided in terms of a subscriber who is typically an individual, but the subscriber can also be a commercial entity, such as a credit card company, retail store, telemarketer, and the like. These entities typically receive inquiries from individuals in response to mailings to the individuals or they "cold call" individuals by simply selecting telephone numbers on a sequential basis. In either instance, the commercial entity needs to retrieve customer address information to respond to a customer request for service and this is presently effected by the employee of the commercial entity sequencing through a series of questions so the required data is obtained orally from the customer. Using the present automatic address book update system, this function can be automatically executed at step 301 if the customer has authorized the use of their address information for this purpose. If not, or as an alternative, the automatic address book update system can enable the commercial entity to activate the address book information retrieval by the customer and/or the employee of the commercial entity entering a control code to initiate the address book information retrieval. In this manner, the customer address information is automatically populated in the commercial entity's database, thereby simplifying the servicing of the customer's service request.

Summary

The automatic address book update system is architected to automatically update the data contained therein, by automatically populating the address entries of a subscriber's computerized address book system. This is accomplished as part of the origination/receipt of a telephone call by the subscriber, where the Local Exchange Carrier (LEC) maintains a customer database (identifying the name, address, telephone number) of their local customers and can also retrieve this information from other Local Exchange Carriers on a long distance call.

What is claimed:

1. An automatic address book update system for automatically maintaining address information in a plurality of subscriber address books, comprising:
   means for storing a set of individual address data for a plurality of individuals;
   means, responsive to the origination of a telephone call between a calling party and a called party, for determining subscription of at least one of the calling and called parties to an automatic address book update service; means, responsive to subscription of at least one of the calling and called parties to an automatic address book update service, for propagating address book data to at least one address book of said at least one of the calling and called parties who subscribes to an automatic address book update service; and
   means for disabling said means for propagating for at least one of: outgoing calls, calls from a calling party occurring at a frequency less than a predetermined threshold, calls to a called party occurring at a frequency less than a predetermined threshold, calls from a calling party occurring at a number less than a predetermined threshold, calls to a called party occurring at a number less than a predetermined threshold, calls from predetermined numbers, calls to predetermined numbers.

2. The automatic address book update system of claim 1 wherein said means for determining comprises:
   means, responsive to a one of said calling and called parties being served by a remotely located local exchange server, for communicating with said remotely located local exchange server to determine subscription of said one of said calling and called parties to an automatic address book update service.

3. The automatic address book update system of claim 2 wherein said means for propagating comprises:
   means for retrieving address book data from said remotely located local exchange server for said one of said calling and called parties who subscribes to an automatic address book update service and is served by said remotely located local exchange server.

4. The automatic address book update system of claim 3 wherein said means for propagating further comprises:
   means for accessing an address book server identified in said retrieved address book data; and
   means for transmitting address book data to said address book server indicative of the identity of said one of said calling and called parties who subscribes to an automatic address book update service and is served by said remotely located local exchange server and the party with whom they are communicating on said telephone call.

5. The automatic address book update system of claim 4 wherein said means for propagating further comprises:
   means for comparing address book entries maintained by said address book server for said one of said calling and called parties who subscribes to an automatic address book update service and is served by said remotely located local exchange server with the data relating to said telephone call to determine whether a new address book entry or an update to an sting address book entry is required.

6. The automatic address book update system of claim 1 wherein said means for propagating comprises:
   means for retrieving address book data from said means for storing for said at least one of said calling and called parties who subscribes to an automatic address book update service.

7. The automatic address book update system of claim 6 wherein said means for propagating further comprises:
   means for acing an address book server identified in said retrieved address book data; and
   means for transmitting address book data to said address book server indicative of the identity of said at least one of said calling and called parties who subscribes to an automatic address book update service and the party with whom they are communicating on said telephone call.

8. The automatic address book update system of claim 7 wherein said means for propagating fur comprises:
   means for comparing address book entries maintained by said address book server for said at least one of said caging and called parties who subscribes to an automatic address book update service with the data relating to the said telephone call to determine whether a new address book entry or an update to an existing address book entry is required.

9. The automatic address book update system of claim 1 wherein said Customer service authorization means comprises:
   remote customer authorization means, responsive to a one of said calling and called parties being served by a remotely located local exchange server, for communicating with said remotely located local exchange so to determine subscription of said one of said calling and called parties to an automatic address book update service; and
   remote data access means for retrieving address book data from said remotely located local exchange server for said one of said calling and called parties who subscribes to an automatic address book update service and is served by said remotely located local exchange server.

10. A method of operating an automatic address book update system for automatically maintaining address information in a plurality of subscriber address books, comprising the steps of:
    storing in a memory a set of individual address data for a plurality of individuals;
    determining, in response to the origination of a telephone call between a calling party and a called party, subscription of at least one of the calling and called parties to an automatic address book update service;

propagating, in response to subscription of at last one of the calling and called parties to an automatic address book update service, address book data to at least one address book of said at least one of the calling and called parties who subscribes to an automatic address book update service; and disabling said step of propagating for at least one of outgoing calls, calls from a calling party occurring at a frequency less than a predetermined threshold, calls to a called party occurring at a frequency less than a predetermined threshold, calls form a calling party occurring at a number less than a predetermined threshold, calls to a called party occurring at a number less than a predetermined threshold, calls from predetermined numbers, calls to predetermined numbers.

11. The method of operating an automatic address book update system of claim 10 wherein said step of determining comprises.

communicating, in response to a one of said calling and called parties being served by a remotely located local exchange server, with said remotely located local exchange server to determine subscription of said one of said calling and called parties to an automatic address book update service.

12. The method of operating an automatic address book update system of claim 11 wherein said step of propagating comprises:

retrieving address book data from said remotely located local exchange server for said one of said calling and called parties who subscribes to an automatic address book update service and is served by said remotely located local exchange server.

13. The method of operating an automatic address book update system of claim 12 wherein said step of propagating further comprises:

accessing an address book server identified in said retrieved address book data; and transmitting address book data to said address book server indicative of the identity of said one of said calling and called parties who subscribes to an automatic address book update and is served by said remotely located local exchange server and the party with whom they are communicating on said telephone call.

14. The method of operating an automatic address book update system of claim 13 wherein said step of propagating her comprises:

comparing address book entries maintained by said address book server for said one of said calling and called parties who subscribes to an automatic address book update service and is served by said remotely located local exchange server with the data relating to said telephone call to determine whether a new address book entry or an update to an existing address book entry is required.

15. The method of operating an automatic address book update system of claim 10 wherein said step of propagating comprises:

retrieving address book data from said memory for said at least one of said calling and called parties who subscribes to an automatic address book update service.

16. The method of operating an automatic address book update system of claim 15 wherein said step of propagating further comprises:

accessing an address book server identified in said retrieved address book data; and transmitting address book data to said address book server indicative of the identity of said at least one of said calling and called parties who subscribes to an automatic address book update service and he part with whom they are communicating on said telephone call.

17. The method of operating an automatic address book update system of claim 16 wherein said step of propagating further comprises:

comparing address book entries maintained by said address book server for said at least one of said calling and called parties who subscribes to an automatic address book update service with the data relating to the said telephone call to determine whether a new address book entry or an update to an existing address book entry is required.

18. An automatic address book update system operational in a local exchange server of a public switched telephone network for automatically maintaining address information in a plurality of subscriber address books, comprising:

customer memory means for storing a set of individual address data for a plurality of individuals;

customer service authorization means, responsive to the origination of a telephone call between a calling party and a called party, for determining subscription of at least one of the calling and called parties to an automatic address book update service;

address book data entry means, responsive to subscription of at least one of the calling and called parties to an automatic address book update service, for propagating address book data to at least one address book of said at least one of the calling and caged parties who subscribes to an automatic address book update service; and can filtering means for disabling said address book data entry means for at least one of: outgoing calls, calls from a calling party occurring at a frequency less than a predetermined threshold, calls to a called party occurring at a frequency less than a predetermined threshold, calls from a calling party occurring at a number less than a predetermined threshold, calls to a called party occurring at a number less than a predetermined threshold, calls from predetermined numbers, calls to predetermined numbers.

19. The automatic address book update system of claim 18 wherein said address book data entry means comprises:

means for retrieving address book data from said customer memory means identifying an address book server who maintains an address book for said at least one of said calling and called parties who subscribes to an automatic address book update service;

data communication means for accessing said address book server; and data transmission means for transmitting address book data to said address book server indicative of the identity of said at least one of said calling and called parties who subscribes to an automatic address book update service and the party with whom they are communicating on said telephone call.

20. The automatic address book update system of claim 19 wherein said address book data entry means further comprises:

address book content review means for comparing address book entries maintained by said address book server for said at least one of said calling and called parties who subscribes to an automatic address book update service with the data relating to the said telephone call to determine whether a new address book entry or an update to an existing address book entry is required.

* * * * *